(12) United States Patent
Ye et al.

(10) Patent No.: US 12,726,908 B2
(45) Date of Patent: Sep. 1, 2026

(54) SYSTEM AND METHOD FOR NETWORK DYNAMIC ON/OFF SIGNALING

(71) Applicant: Apple Inc., Cupertino, CA (US)

(72) Inventors: Sigen Ye, San Diego, CA (US); Yushu Zhang, Beijing (CN); Chunhai Yao, Beijing (CN); Hong He, Cupertino, CA (US); Wei Zeng, Cupertino, CA (US); Dawei Zhang, Cupertino, CA (US); Seyed Ali Akbar Fakoorian, San Diego, CA (US); Oghenekome Oteri, San Diego, CA (US); Chunxuan Ye, San Diego, CA (US)

(73) Assignee: Apple Inc., Cupertino, CA (US)

( * ) Notice: Subject to any disclaimer, the term of this patent is extended or adjusted under 35 U.S.C. 154(b) by 400 days.

(21) Appl. No.: 18/131,742

(22) Filed: Apr. 6, 2023

(65) Prior Publication Data

US 2023/0328655 A1 Oct. 12, 2023

Related U.S. Application Data

(60) Provisional application No. 63/329,586, filed on Apr. 11, 2022.

(51) Int. Cl.
*H04W 52/02* (2009.01)
*H04W 72/23* (2023.01)
(Continued)

(52) U.S. Cl.
CPC ......... *H04W 52/028* (2013.01); *H04W 72/23* (2023.01); *H04W 72/232* (2023.01); *H04W 88/08* (2013.01); *Y02D 30/70* (2020.08)

(58) Field of Classification Search
CPC ... H04W 52/028; H04W 72/23; H04W 88/08; H04W 72/232; H04W 76/28; H04L 5/0053; H04B 7/0695; Y02D 30/70
See application file for complete search history.

(56) References Cited

U.S. PATENT DOCUMENTS

2012/0275335 A1* 11/2012 Huang .............. H04W 52/0206 370/252
2020/0092814 A1* 3/2020 Zhou ................. H04W 52/0235
(Continued)

FOREIGN PATENT DOCUMENTS

CN 104661241 A * 5/2015 ............ H04W 76/38
CN 116707728 A * 9/2023 .......... H04W 72/044
(Continued)

OTHER PUBLICATIONS

Zhou et al., "Network Energy Saving in a Wireless Communication System", U.S. Appl. No. 63/290,115 Dec. 16, 2021, Total pp. 135 (Year: 2021).*

(Continued)

*Primary Examiner* — Shah M Rahman
(74) *Attorney, Agent, or Firm* — STERNE, KESSLER, GOLDSTEIN & FOX P.L.L.C.

(57) ABSTRACT

An approach is described for a dynamic off period of a base station within a wireless communication environment and a process for notifying a UE of the same. In a first scenario, the DCI message is modified with newly-defined values indicative of the different power saving states (i.e., "dynamic off states") of the base station. These power saving states may defined as suspending one or both of downlink transmission and uplink reception. In another scenario, a new notification message is defined. In either case, the notification signal may also include cell and/or beam specific parameters as well as an application delay that defines a start time of the dynamic off period.

20 Claims, 9 Drawing Sheets

(51) Int. Cl.

| | |
|---|---|
| *H04W 72/232* | (2023.01) |
| *H04W 88/08* | (2009.01) |

(56) References Cited

U.S. PATENT DOCUMENTS

| | | | | |
|---|---|---|---|---|
| 2021/0185609 | A1* | 6/2021 | Zhou | H04W 52/0206 |
| 2022/0132425 | A1* | 4/2022 | Seo | H04W 52/02 |
| 2022/0174651 | A1* | 6/2022 | Seo | H04W 76/28 |
| 2022/0256458 | A1* | 8/2022 | Noh | H04B 7/06 |
| 2022/0295404 | A1* | 9/2022 | Wang | H04W 52/0235 |
| 2024/0340790 | A1* | 10/2024 | Zhou | H04W 52/0206 |
| 2024/0397421 | A1* | 11/2024 | Liu | H04W 52/0206 |
| 2025/0063558 | A1* | 2/2025 | Li | H04W 72/0457 |
| 2025/0081288 | A1* | 3/2025 | Moon | H04L 5/00 |
| 2025/0106756 | A1* | 3/2025 | Kim | H04W 24/10 |
| 2025/0234424 | A1* | 7/2025 | Luo | H04W 76/28 |

FOREIGN PATENT DOCUMENTS

| | | | | |
|---|---|---|---|---|
| EP | 2362697 | B1 * | 8/2013 | H04W 76/28 |
| WO | WO 2020/146499 | A1 | 7/2020 | |
| WO | WO 2023/087239 | A1 | 5/2023 | |
| WO | WO 2023/091246 | A1 | 5/2023 | |
| WO | WO 2023/114493 | A1 | 6/2023 | |

OTHER PUBLICATIONS

Li et al., "User equipment and base station involved in an adaptation procedure", Application No. EP 21217143.3 Dec. 22, 2021, Total pp. 85 (Year: 2021).*

International Search Report and Written Opinion for International Application No. PCT/US2023/017883, European Patent Office, Netherlands, mailed Jul. 17, 2023, 22 pages.

* cited by examiner

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 56 | S1 | S1 | S1 | S1 | S1 | S1 | S1 | S1 | S1 | S1 | S1 | S1 | S1 | S1 |
| 57 | S2 | S2 | S2 | S2 | S2 | S2 | S2 | S2 | S2 | S2 | S2 | S2 | S2 | S2 |
| 58 | S3 | S3 | S3 | S3 | S3 | S3 | S3 | S3 | S3 | S3 | S3 | S3 | S3 | S3 |

| | | | | | |
|---|---|---|---|---|---|
| Entry 1 | 57 | 57 | 255 | 255 | 255 |
| Entry 2 | 58 | 58 | 255 | 255 | 255 |
| Entry 3 | 56 | 56 | 56 | 56 | 56 |
| Entry 4 | 56 | 56 | 56 | 255 | 255 |

360a
360b
360c
360d
370

SYSTEM AND METHOD FOR NETWORK DYNAMIC ON/OFF SIGNALING

REFERENCE TO RELATED APPLICATION

This application claims the benefit of U.S. Provisional Patent Application No. 63/329,586, titled "System and Method of Dynamic ON/OFF Signaling," filed on Apr. 11, 2022, the disclosure of which is incorporated by reference herein in its entirety.

BACKGROUND

Field

The described aspects generally relate to an enhancement in wireless communication.

Related Art

Different methods of energy saving may involve actions taken by the user equipment (UE), while others may involve action of the base station (eNB or gNB).

SUMMARY

Some aspects of this disclosure relate to apparatuses and methods for implementing an enhancement in wireless communications. For example, systems and methods are provided for implementing power saving at a base station and notifying UEs of the power saving measures.

In some aspects, a base station is disclosed that comprises a transceiver configured to communicate wireless signals with a user equipment (UE) and one or more processors. The one or more processors are configured to determine a dynamic off state for the base station, the dynamic off state suspending at least one of downlink (DL) transmission or uplink (UL) reception during a dynamic off period. The one or more processors are further configured to determine the dynamic off period for the base station during which to apply the dynamic off state, generate a downlink control information (DCI) message having a slot format indicator that identifies the dynamic off state and the dynamic off period, and transmit, via the radio transceiver, the DCI message to the UE.

In a further aspect, the one or more processors are further configured to enter the dynamic off state.

In a further aspect, the DCI message with the slot format indicator includes a newly-defined DCI value that includes one of a plurality of dynamic off states.

In a further aspect, the one or more processors are further configured to generate an entry within the slot format indicator of the DCI message that includes the newly-defined value associated with the dynamic off state.

In a further aspect, the one or more processors are further configured to generate the DCI message with an explicit beam index.

In a further aspect, the explicit beam index is included within a predefined field of the DCI message.

In some aspects, a method for initiating a dynamic off period at a base station is disclosed. The method includes determining a dynamic off state for the base station during which at least one of downlink (DL) transmission or uplink (UL) reception is suspended. The method further includes determining a dynamic off period during which to apply the dynamic off state, generating a downlink control information (DCI) message having a slot format indicator that identifies the dynamic off state and the dynamic off period, and transmitting the DCI message to the UE.

In a further aspect, the method further includes entering the dynamic off state.

In a further aspect, the slot format indicator of the DCI message includes a newly-defined DCI value corresponding to the dynamic off state.

In a further aspect, the method further includes generating an entry within the slot format indicator of the DCI message that includes the newly-defined value associated with the dynamic off state.

In a further aspect, the method includes generating the DCI message with an explicit beam index.

In a further aspect, the explicit beam index is included within a predefined field of the DCI message.

In some aspects, a method is disclosed for initiating a dynamic off period at a base station that includes determining a dynamic off state for the base station, determining a dynamic off period during which to apply the dynamic off state, determining dynamic off parameters associated with the dynamic off state, determining an application delay that defines a starting point of the dynamic off period. The method further includes generating a notification message that includes information relating to the dynamic off state, the dynamic off period, the dynamic off parameters, and the application delay, transmitting the notification message to a user equipment (UE), and entering the dynamic off state according to the dynamic off parameters after an elapse of the application delay.

In a further aspect, the dynamic off parameters indicate whether downlink transmission will be suspended during the dynamic off period, and whether uplink reception will be suspended during the dynamic off period.

In a further aspect, the dynamic off parameters include indications of one or more cells to which the dynamic off parameters apply.

In a further aspect, the dynamic off parameters include indications of one or more beams to which the dynamic off parameters apply.

In a further aspect, the application delay defines an amount of delay between transmission of the notification message and a start of the dynamic off period.

In a further aspect, the notification message includes a plurality of cell indices for identifying cell-specific parameters.

In a further aspect, the base station determines a periodicity with which the dynamic off period will be applied, the periodicity defining an on/off pattern for the dynamic off period.

In a further aspect, the dynamic off period is a one-time duration.

In some aspects, a user equipment (UE) is disclosed that includes a transceiver configured to communicate wireless signals with a base station and one or more processors. The one or more processors are configured to receive a downlink control information (DCI) message having a slot format indicator from a base station, parse the received DCI message, identify a dynamic off state from the parsed DCI message, and enter the dynamic off state.

In a further aspect, the DCI message includes at least one DCI extension value that identifies the dynamic off state, and the parsing of the received DCI message includes an extraction of the at least one DCI extension value.

In a further aspect, the parsing includes extracting dynamic off information from the dynamic off state.

In a further aspect, the dynamic off state identifies at least one of uplink reception or downlink transmission that is suspended at the base station.

In a further aspect, the one or more processors are further configured to withhold messages to be transmitted to the base station during the dynamic off state.

In a further aspect, the one or more processors are further configured to enter a low-power state during the dynamic off state.

In some aspects, a user equipment (UE) is disclosed that includes a transceiver configured to communicate wireless signals with a base station and one or more processors. The one or more processors are configured to receive a notification message from the base station, parse the notification message according to a stored message structure, identify based on the parsing a dynamic off state included in the notification message, and enter the dynamic off state In a further aspect, the one or more processors are further configured to identify an application delay included in the notification message, wherein the dynamic off state is entered after an elapse of the application delay.

In a further aspect, the dynamic off state indicates that at least one of downlink transmission or uplink reception will be suspended at the base station.

In a further aspect, the notification message identifies one or more cells to which the dynamic off state applies.

In a further aspect, the notification message identifies one or more beams to which the dynamic off state applies.

In a further aspect, the one or more processors are further configured to withhold messages to be transmitted to the base station during the dynamic off state.

In a further aspect, the one or more processors are further configured to enter a low-power state during the dynamic off state.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
FIG. 1 illustrates an exemplary wireless communication environment according to some aspects of the disclosure.
Figure 1:
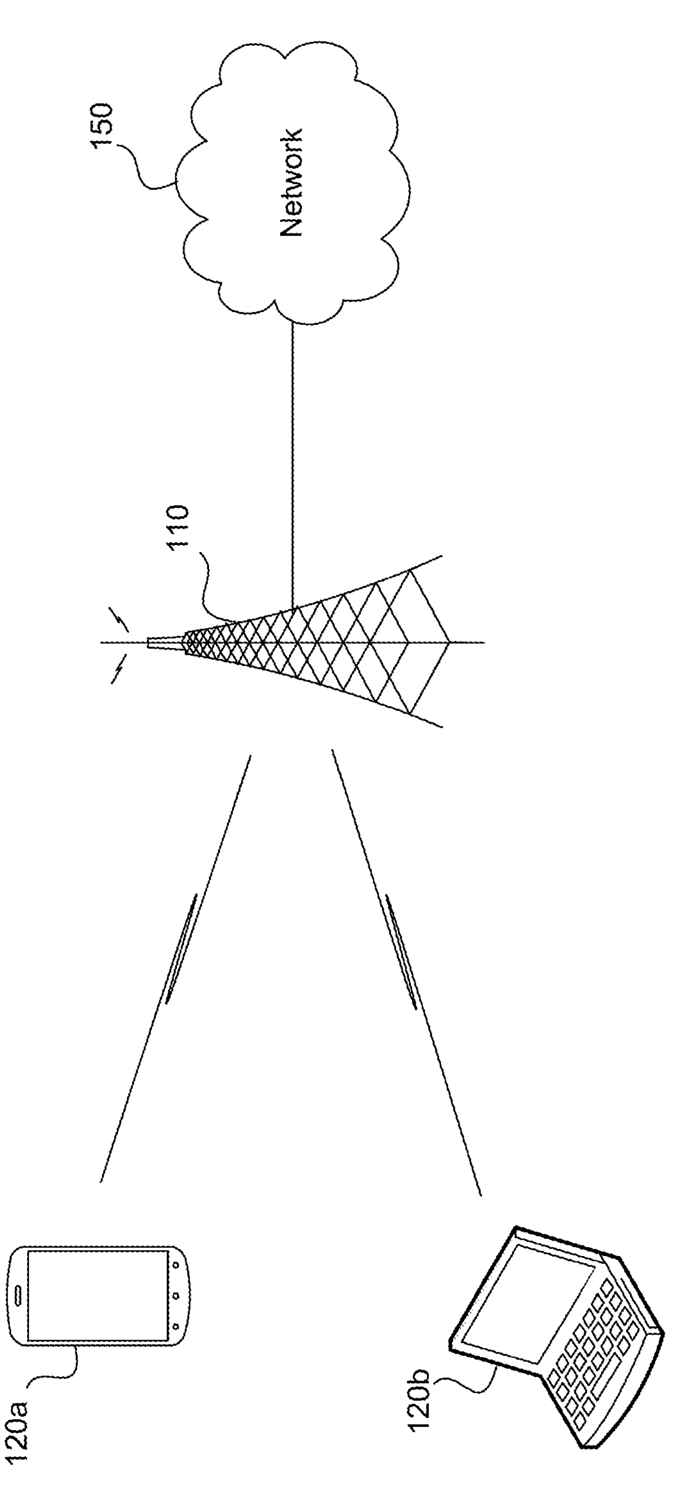

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure include apparatuses and methods for implementing enhancements to wireless communications. For example, systems and methods are provided for implementing dynamic on/off by a base station operating in a wireless network.

FIG. 1 illustrates an exemplary wireless communication environment 100 according to some aspects of the disclosure. As shown in FIG. 1, a base station 110 is positioned within a wireless communication network for communicating with user equipment (UE) devices 120. In embodiments, the UEs may include cellular telephones (e.g., 120*a*), laptop computers (e.g., 120*b*) or other electronic communication devices connected to the network by way of the base station 110. In a 4G network, the base station is referred to as an evolved node b (eNB), whereas in a 5G network, the base station is referred to as next generation node b (gNB). The principles and aspects of this disclosure are equally applicable to both eNBs and gNBs. Therefore, for purposes of this disclosure, the base station 110 will be referred to simply as "base station." Meanwhile, network capable user devices will be referred to herein as "user equipment" or "UE".

In the environment 100, the base station 110 provides gateway connectivity between the UEs 120 and the network 150. The base station 110 transmits signals from the network to the UEs 120, and receives signals from the UEs 120 for delivery to the network 150. In the present disclosure, in order to conserve energy, the base station 110 may occasionally enter into a power saving mode, otherwise referred to as a dynamic off mode.

Figure 2:
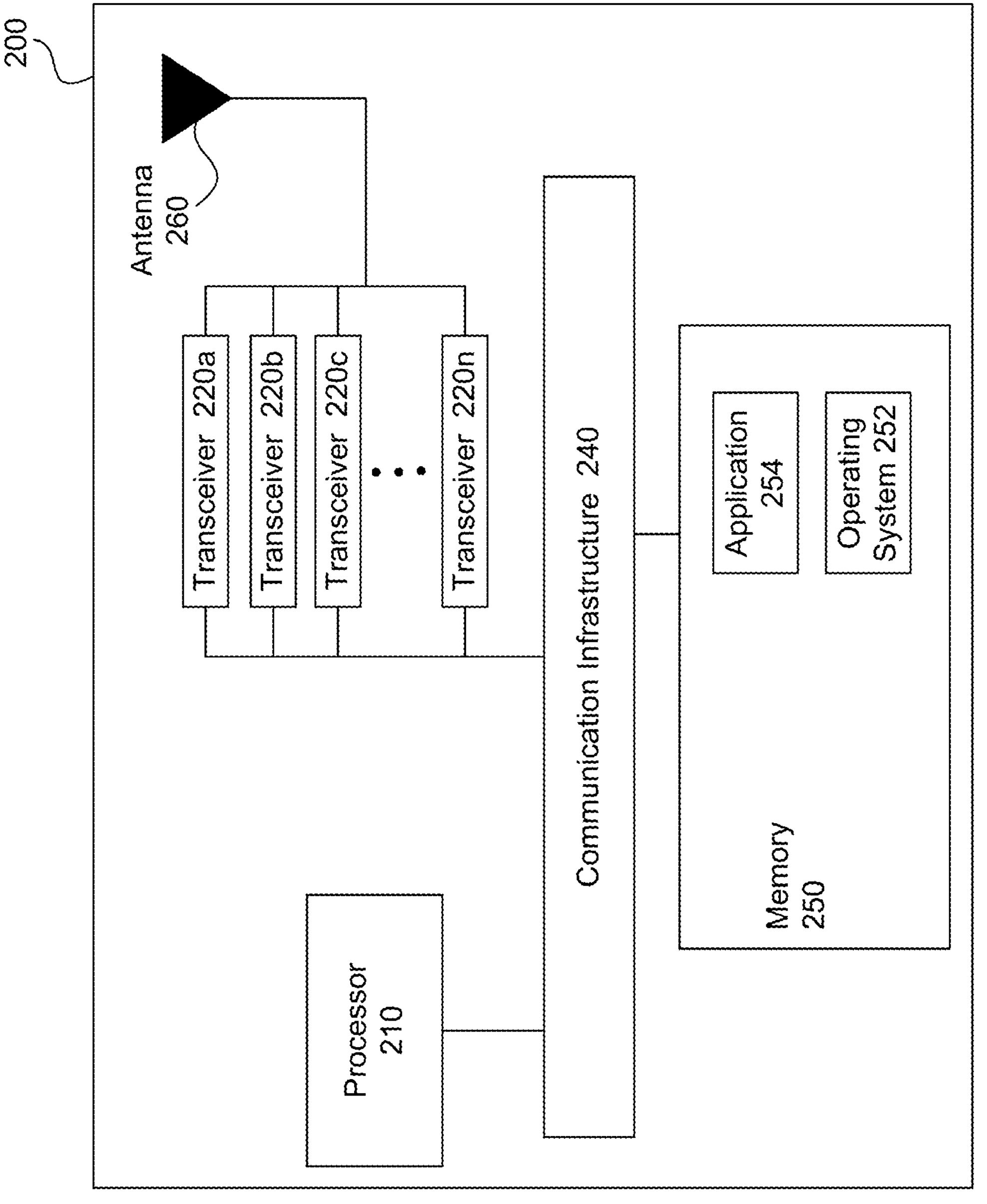
FIG. 2 illustrates a block diagram of an exemplary wireless communication system, according to aspects of the disclosure.

FIG. 2 illustrates a block diagram of an exemplary wireless communication system 200, according to some aspects of the disclosure. System 200 may be any of the electronic devices (e.g., base station 110, UE 120) of system 100. System 200 includes processor 210, one or more transceivers 220*a*-220*n*, communication infrastructure 240, memory 250, operating system 252, application 254, and antenna 260. Illustrated systems are provided as exemplary parts of system 200, and system 200 can include other circuit(s) and subsystem(s). Also, although the systems of system 200 are illustrated as separate components, the aspects of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210 and/or one or more transceivers 220*a*-220*n*. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to, automated assistant, video calling, radio streaming, video streaming, remote control, and/or other user applications.

System 200 can also include communication infrastructure 240. Communication infrastructure 240 provides communication between, for example, processor 210, one or more transceivers 220*a*-220*n*, and memory 250. In some implementations, communication infrastructure 240 may be a bus. Processor 210 together with instructions stored in memory 250 performs operations enabling system 200 of system 100 to implement mechanisms for performing dynamic off application and signaling, as discussed herein.

One or more transceivers 220*a*-220*n* transmit and receive communications signals that support mechanisms for performing dynamic off application and signaling, as discussed herein, according to some aspects, and may be coupled to antenna 260. Antenna 260 may include one or more antennas that may be the same or different types. One or more transceivers 220*a*-220*n* allow system 200 to communicate with other devices that may be wired and/or wireless. In some examples, one or more transceivers 220*a*-220*n* can include processors, controllers, radios, sockets, plugs, buffers, and like circuits/devices used for connecting to and communication on networks. According to some examples, one or more transceivers 220*a*-220*n* include one or more circuits to connect to and communicate on wired and/or wireless networks.

According to some aspects, one or more transceivers 220*a*-220*n* can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 220*a*-220*n* can include more or fewer systems for communicating with other devices.

In some examples, one or more transceivers 220*a*-220*n* can include one or more circuits (including a WLAN transceiver) to enable connection(s) and communication over WLAN networks such as, but not limited to, networks based on standards described in IEEE 802.11. Additionally, or alternatively, one or more transceivers 220*a*-220*n* can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, transceiver 220*n* can include a Bluetooth™ transceiver.

Additionally, one or more transceivers 220*a*-220*n* can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), New Radio (NR) and the like. For example, one or more transceivers 220*a*-220*n* can be configured to operate according to one or more of Release-15, Release-16, Release-17, or later of 3GPP standard.

According to some aspects, processor 210, alone or in combination with computer instructions stored within memory 250, and/or one or more transceiver 220*a*-220*n*, implements mechanisms for performing dynamic off application and signaling, as discussed herein. For example, processor 210 can be configured to determine dynamic off periods and to generate notification messages, and transceiver 220 is configured to send the dynamic off notification messages to UEs for implementing dynamic off periods. In an alternative configuration, the transceivers 220 can be configured to receive dynamic off notification messages from the base station, and the processor 210 can be configured to parse the received dynamic off notification messages and to implement the communication restrictions defined by those dynamic off notification messages.

In some embodiments, a base station (e.g. 110) implements power saving and DCI formatting controlled and determined by its processor 210. In embodiments, the power saving is configured to determine whether and when the base station should enter a dynamic off state, and to what extent. For example, in different situations, the base station may determine that only downlink transmission is permitted, only uplink reception is permitted, or that neither downlink transmission nor uplink reception is permitted. Each of these different options is considered a different dynamic off state.

Based on the dynamic off state that is selected, the base station generates the proper signaling for notifying the UE. In an embodiment, the base station signals the power saving state to the UE through the use of a slot format indicator. In some embodiments, the slot format indicator is generated by modifying an existing DCI message. In an embodiment, the DCI message is a DCI format 2_0 message. For example, DCI is a signaling mechanism that allows the network to dynamically indicate the slot formats (e.g., indicating which symbols are Downlink (DL), Uplink (UL), or flexible within a slot) for a number of slots. To do this, the DCI message uses a slot format indicator. Radio Resource Control (RRC) signaling includes a SlotFormatCombinationsPerCell field that defines all the possible slot formats that can be indicated by DCI message. The slot format indicator of the DCI message points to an entry in a SlotFormatCombinations field within the SlotFormatCombinationsPerCell. In the current 3GPP specification, the slot format is an index value between 0 and 255. However, only values 0-55 and 255 are currently defined, while values 56-254 are undefined, and therefore available for extension.

Therefore, to support the DCI signaling configuration, new states in addition to the standard DL, UL and flexible states are defined. In embodiment, these new states (also called "power saving states" or "dynamic off states") include:

- S1: no DL transmission or UL reception;
- S2: no DL transmission, but UL reception follows the legacy signaling; and
- S3: no UL reception, but DL transmission follows the legacy signaling.

As discussed above, since values 56-254 are available in the current specification, these new power saving states can be defined within those available values. The base station processor 210 generates the states and associated DCI values and generates the DCI message for transmitting to the UE, to inform the UE of the selected dynamic off state(s).

Although the current DCI message does not support beam-specific indications, the DCI message of the present disclosure can be modified to include such an indication. In an embodiment, the beam index is explicitly included in the DCI message, such as by definition of beam-specific states or through the use of one or more of the available index values. This allows the indication for multiple beams to be included in a single message, and can still allow legacy UEs to receive the same DCI message since they will simply ignore the new fields. In another embodiment, the beam indication is implicitly carried in the signal that is scrambled in a beam-specific manner. For example, currently, a Cyclic Redundancy Check (CRC) scrambles the DCI message based on a corresponding Radio Network Temporary Identifier (RNTI). In this embodiment, the scrambling can further depend upon the beam index, which will allow for the beam indication to be detected by the UE upon descrambling of the DCI. In another example, the physical signal (e.g., Physical Downlink Control Channel (PDDCH) can be scrambled by the beam index. While the latter embodiment has benefits in that it does not require explicit beam indexing in the DCI, these DCI signals will no longer be able to be processed by legacy UEs.

Figures 3A, 3B:
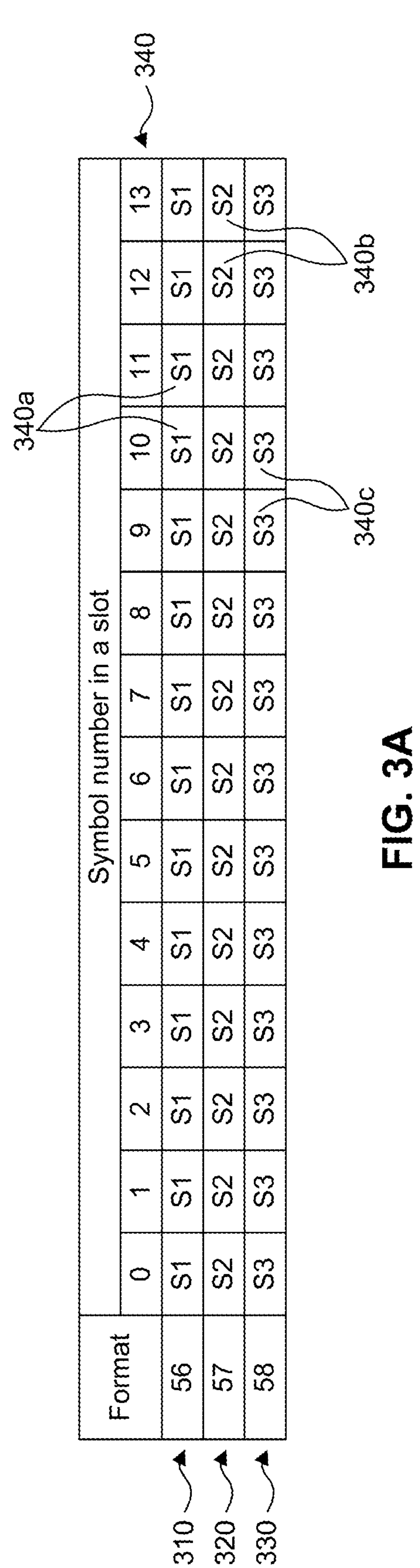
FIG. 3A illustrates exemplary format definitions for a dynamic off signaling according to aspects of the disclosure.
FIG. 3B illustrates exemplary slot configurations for a dynamic off signaling according to aspects of the disclosure.

The modified DCI message in accordance with the above embodiments will now be described with respect to FIGS. 3A and 3B. FIG. 3A illustrates exemplary format definitions for a dynamic off signaling according to aspects of the disclosure. The format definition table defines three new slot formats associated with values 56-58 of the DCI message. Each of the formats includes states associated with different symbol numbers 340. In order to signal each of the different new states described above (e.g., S1, S2, and S3), each format is constructed with the selected state in each of its symbols. For example, format_56 310 (corresponding to value 56) identifies state S1 for each slot 340*a*. Likewise, format_57 320 (corresponding to value 57) identifies state S2 for each slot 340*b*. Finally, format_58 330 (corresponding to value 58) identifies state S3 for each slot 340*c*. (Herein, format_56-58 can be referred to as "extension values") Therefore, when the DCI message is generated, identifying value 56, for example, it will inform the UE the state S1 is to be invoked during the corresponding time period. This is exemplified in FIG. 3B. Note that only one of the states S1, S2 and S3 is used for all the symbols in a slot to define a slot format in this example. However, a mix of S1, S2, S3 and/or the legacy states ('D', 'U', 'F') can be used for different symbols in a slot format. In addition, new entries for the slot formats can be pre-defined in the standards (as for DCI messages in legacy systems) or configured or a mix of both.

FIG. 3B illustrates exemplary slot configurations for a dynamic off signaling according to aspects of the disclosure. FIG. 3B discloses four example entries within the DCI message. The example entries 360 each include five slots, assuming that the UL/DL configuration is configured by tdd-UL-DL-ConfigurationCommon with a periodicity of five slots. However, the disclosure is not limited to 5 slots, as any number of slots can be used.

As shown in FIG. 3B, Entry 1 360*a* defines the first and second slots as having value 57, which is defined above as corresponding to state S2 (no DL transmission, UL reception follows other signaling). The remaining three slots of Entry 1 360*a* are set to value 255. Similarly, the first two slots of Entry 2 360*b* are set to value 58, which is defined above as corresponding to state S3 (no UL reception, but DL transmission follows other signaling). The remaining three slots are set to value 255.

In the example of FIG. 3B, Entry 3 360*c* sets all five slots to value 56, which is defined above as corresponding to value S1 (no DL transmission or UL reception). Finally, Entry 4 360*d* sets the first three slots to value 56 (e.g., state S1), and the remaining two slots to value 255.

These entries indicate to the UE the different dynamic off states. Notably, value 255 informs the UE to follow the RRC configuration for that slot as specified in TS 38.213. As described above, Entry 1 360*a* specifies no DL transmission for the next two slots, Entry 2 360*b* specifies no UL reception for the next two slots, Entry 3 360*c* specifies no DL or UL for the next 5 five slots, and Entry 4 360*d* specifies no DL or UL for the next three slots. After each of those periods, the UE reverts to follow the RRC configuration as defined by value 255.

Returning to FIG. 2, once the DCI message has been generated according to the above description, the transceiver 220 transmits the DCI message to the UE via the antenna 260 to notify the UE of the power saving being initiated by the base station.

In another embodiment, rather than modifying (also called "extending") the existing DCI message, the base station instead generates a notification message. Such a separate message provides more flexibility in design, without having to adhere to the existing framework of the DCI message. In this embodiment, the base station 205 can indicate a common off duration that is applicable for both DL and UL. Alternatively, the base station 205 can separately indicate the off duration for DL and UL, either in a single message or across two separate messages. In embodiments, the indication is broadcast to all UEs (e.g., in a System Information Block (SIB) or a DCI message that is addressed to all UEs), or transmitted in a group-common message (e.g, a DCI message that is addressed to multiple UEs). This notification message may be transmitted by itself as a separate notification message, or transmitted together with other information in a message.

In this embodiment, the indication may be beam-specific or common for all beams. For example, in an embodiment, a beam index is explicitly included within the power saving message. This allows the indication for multiple beams to be included in a single message. Alternatively, the indication is implied based on the scrambling of the message in a beam-specific manner. As discussed above, scrambling of the message can be performed based on the corresponding RNTI. In an alternative embodiment, the physical signal (e.g., PDDCH) can be scrambled by the beam index.

Due to the flexibility associated with the notification message, other details of the dynamic off mode can be identified. For example, in an embodiment, the off duration/pattern can be defined. This may be defined as a one-time off duration that is either pre-defined or dynamically indicated. Additionally or alternatively, a periodicity (e.g., on/off pattern) can be defined. In different embodiments, the periodicity can be pre-defined/configured and is activated/deactivated by the message, or is selected from one of many different pre-defined/configured options by the message.

In addition to the duration/pattern, an application delay can also be defined by either the notification message or the DCI message. For example, an application delay may be necessary for the dynamic off indication because the UE needs time to decode/parse the message and take corresponding action (e.g., to cancel transmission/reception when necessary). In an embodiment, the application delay is predefined (e.g., based on the processing time needed at the UE). In another embodiment, the application delay is dynamically indicated by the base station. In this latter embodiment, a minimum value may be defined. The application delay may be separately defined for DL and UL. In some embodiments, there may be no application delay for DL (similar to how DL for DCI is defined today), as the UE may be able to revert DL processing after decoding DCI.

In an embodiment, the notification message can also define an off state for DL, or UL, or both. For example, in one embodiment, two states are defined: (1) on; or (2) no DL/UL. This requires only a single bit in the state field of the notification message. In another embodiment, four states are defined: (1) on; (2) no DL/UL; (3) no DL; or (4) no UL. This requires two bits for the state field.

In an embodiment, the notification message also includes a cell index field (e.g., in case of carrier aggregation). The cell index field indicates which cell the dynamic off indication is for. This requires the base station to define cell indices in a way that is commonly understood by all the UEs. In another embodiment, rather than explicitly including a cell index, the indication for multiple cells can be carried by separately signaling the order of the cells in the message, or by signaling the location of each cell in the message.

In another embodiment, the notification message also includes a beam index field. In an embodiment, the beam index is a Synchronization Signal Block (SSB) index, which is commonly understood by all UEs. In another embodiment, the beam index is a Transmission Configuration Indicator (TCI) state index, which is UE-specifically configured. In this embodiment, the network must ensure that the configurations are aligned among the UEs so that the UEs interpret the TCI state index in the same way. In another embodiment, the beam index is implied, and not explicitly defined in the message.

Figures 4A, 4B:
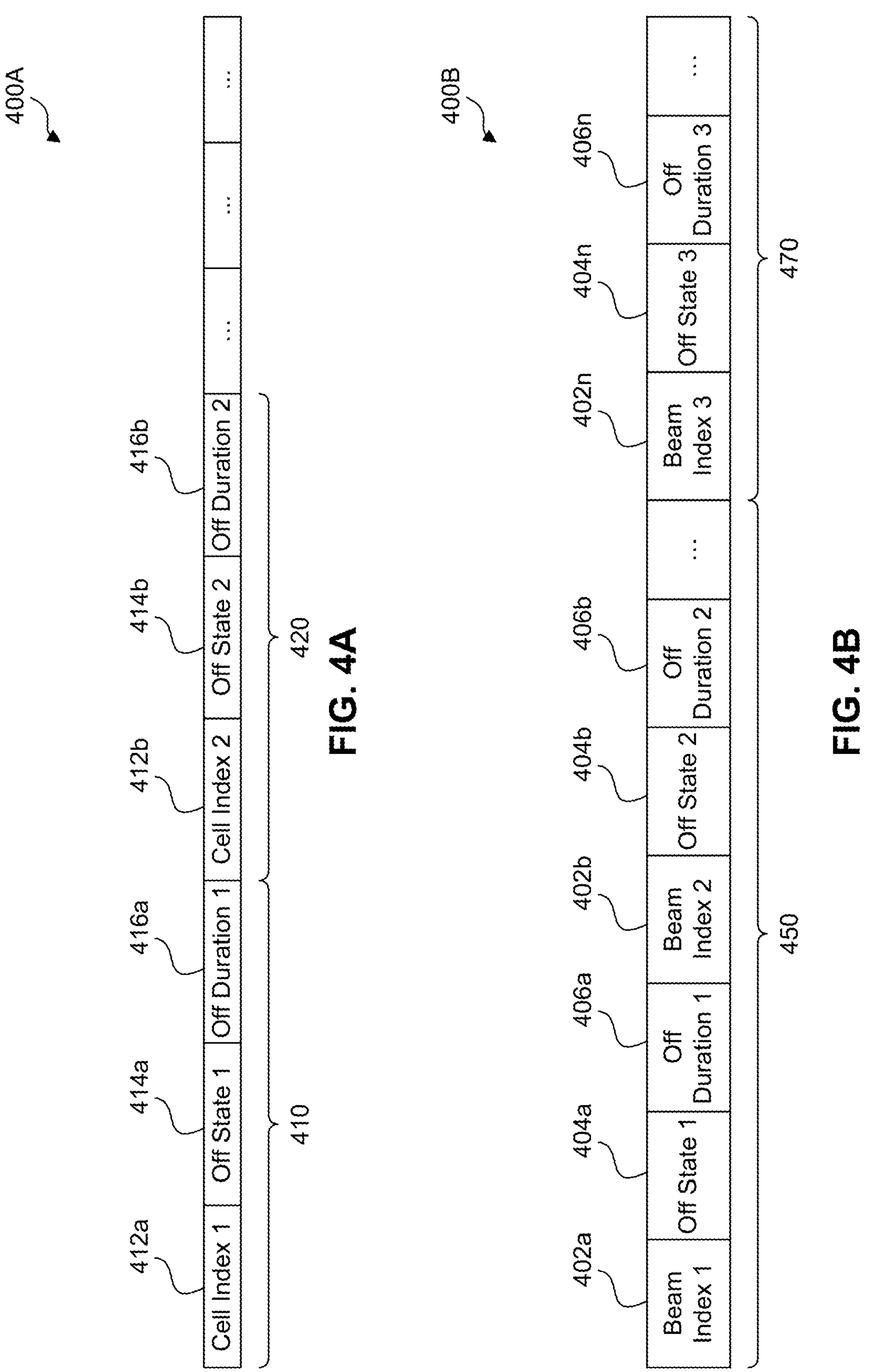
FIG. 4A illustrates an exemplary notification message according to embodiments of the present disclosure.
FIG. 4B illustrates an exemplary notification message according to embodiments of the present disclosure.

FIG. 4A illustrates an exemplary notification message 400A according to embodiments of the present disclosure. In this embodiment, the message 400A is configured to explicitly identify the cells to which the various parameters apply. For example, as shown in FIG. 4A, the message 400A includes different segments 410, 420 associated with different cells. Each segment therefore includes a cell index 412 to identify the cell to which that segment applies.

For example, as shown in FIG. 4A, cell index 1 412*a* identifies a first cell. Then, within the segment 410, an off state 414*a* and an off duration 416*a* are also defined. The off state 414*a* indicates the type of off state that will be applied to this cell (e.g., S1, S2, or S3, above), and the off duration 416*a* identifies an amount of time the cell will apply the off state. Similarly, in segment 420, cell index 2 412*b* identifies the cell to which the parameters apply. Additionally, off state 414*b* indicates the off state that will be applied to the cell and off duration 416*b* indicates the length of time the cell will be in that off state. This pattern can be repeated for any number of segments associated with any number of cells. Additionally, although the example message 400A includes two parameters, any number of parameters can be defined, since the segment start and endpoints can be identified based on the cell indexes.

FIG. 4B illustrates an exemplary notification message 400B according to embodiments of the present disclosure. In this embodiment, the message 400B is configured to implicitly identify the cells to which the various parameters apply. In the example of FIG. 4B, this is accomplished based on the configuration of the message 400B. For example, as shown in FIG. 4B, the message 400B has a predefined configuration. In FIG. 4B, the message 400B has a configuration such that a first cell's parameters 450 are defined in the first 6+ fields. These fields include beam indexes 402*a*, 402*b*, etc., off states 404*a*, 404*b*, etc., and off durations 406*a*, 406*b*, etc. Beam indexes 402*a* and 402*b* identify the beams to which the specific parameters apply, whereas the off states define the states to be applied to those beams for the first cell (e.g., S1, S2, or S3), and off duration defines the length of time those beams will remain in the indicated off state for the first cell. This pattern is then repeated for a second cell 470. These include beam index 402*n*, off state 404*n*, and off duration 406*n*, etc.

Provided that the UE knows the configuration of the message 400B in advance, the UE will be able to process the received notification message appropriately. Returning to FIG. 2, once the base station generates the notification message, the transceiver 220 transmits the message to the UE via antenna 260.

Referring again to FIG. 2 for discussion of the UE, regardless of whether the message is the DCI message or is the notification message, the message is received by the transceiver 220 of the UE via the antenna 260. The UE, via processor 210, then parses the received message. In the case of the notification message, the UE parses the message according to the predefined message configuration (discussed above) in order to identify the off states and off durations that are to be applied to the various beams and cells. Alternatively, in the embodiment where the message is the DCI message, the message is parsed according to the DCI standard, but with additional processing to recognize the new values 56-58, described herein. As a result, the message parsing identifies the cells and the off states and off durations to be applied to those cells.

Once the message has been parsed and the cell parameters identified, the extracted information is used to control transmission and reception by the UE according to the extracted parameters. Specifically, the UE does not transmit UL messages to the BS during states S1 and S3. During S2, the UE is informed that no messages will be received, due to DL transmission being halted at the base station during state S2. These off states are controlled according to the off states defined in the message and for the durations defined in the message. Once the duration ends, the communications infrastructure permits new signal transmissions to be provided to the transceiver for transmission to the base station.

When an off state is indicated, it may mean that the gNB stops transmitting periodic/semi-persistent signals that are broadcast or configured for UEs (e.g., SSB, periodic RS signals such as CSI-RS including tracking CSI-RS, PDCCH, SPS PDSCH), and/or stop receiving periodic/semi-persistent signals configured for UEs (e.g., periodic CSI, semi-persistent CSI, scheduling request, configured grant PUSCH). Optionally, it can be used to override the dynamically scheduled PDSCH/PUSCH/PUCCH/RS also.

Additionally, although the above messages have described to include certain fields, it should be understood that more or fewer fields can be included and that the specific formats of those messages can be modified in accordance with the descriptions of the present disclosure. Methods for implementing the above embodiments will now be described with respect to FIGS. 5 and 6.

Figure 5:
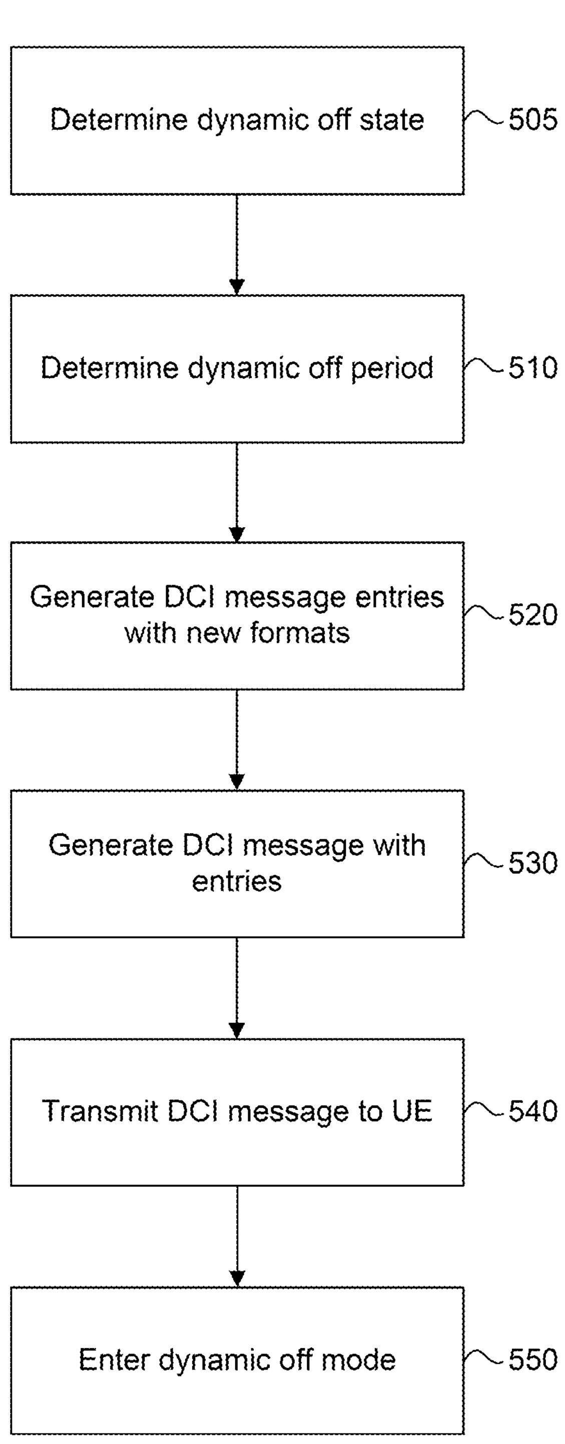
FIG. 5 illustrates a flowchart diagram of an exemplary method for signaling a dynamic on/off according aspects of the disclosure.

FIG. 5 illustrates a flowchart diagram of an exemplary method 500 for signaling a dynamic on/off according aspects of the disclosure. As shown in FIG. 5, the method 500 begins with the base station determining a dynamic off state (505), which includes selecting the dynamic off state from one of a plurality of dynamic off states. Thereafter, the base station determines the dynamic off period during which to apply the dynamic off state (510). This can be repeated for multiple slots having corresponding periods. Once the dynamic off period(s) has been determined, the base station generates entries for use in the slot format indicator of a DCI message to identify the new states to be used during corresponding dynamic off periods (520). As discussed above, in an embodiment, the DCI message is a DCI format 2_0 message and these new states includes states S1, S2, and S3. Additionally, the entries reference new DCI formats each defined to set one of the new states, such as newly-defined formats (e.g., values) 56, 57, or 58, discussed above.

Once the entries have been generated, the base station generates the DCI message with the new entries (530). The base station then transmits the DCI message to the UE (540). Thereafter, the base station enters the dynamic off mode (550) as specified in the DCI message. In this manner, the base station notifies UEs of a dynamic off state using the DCI message.

Figure 6:
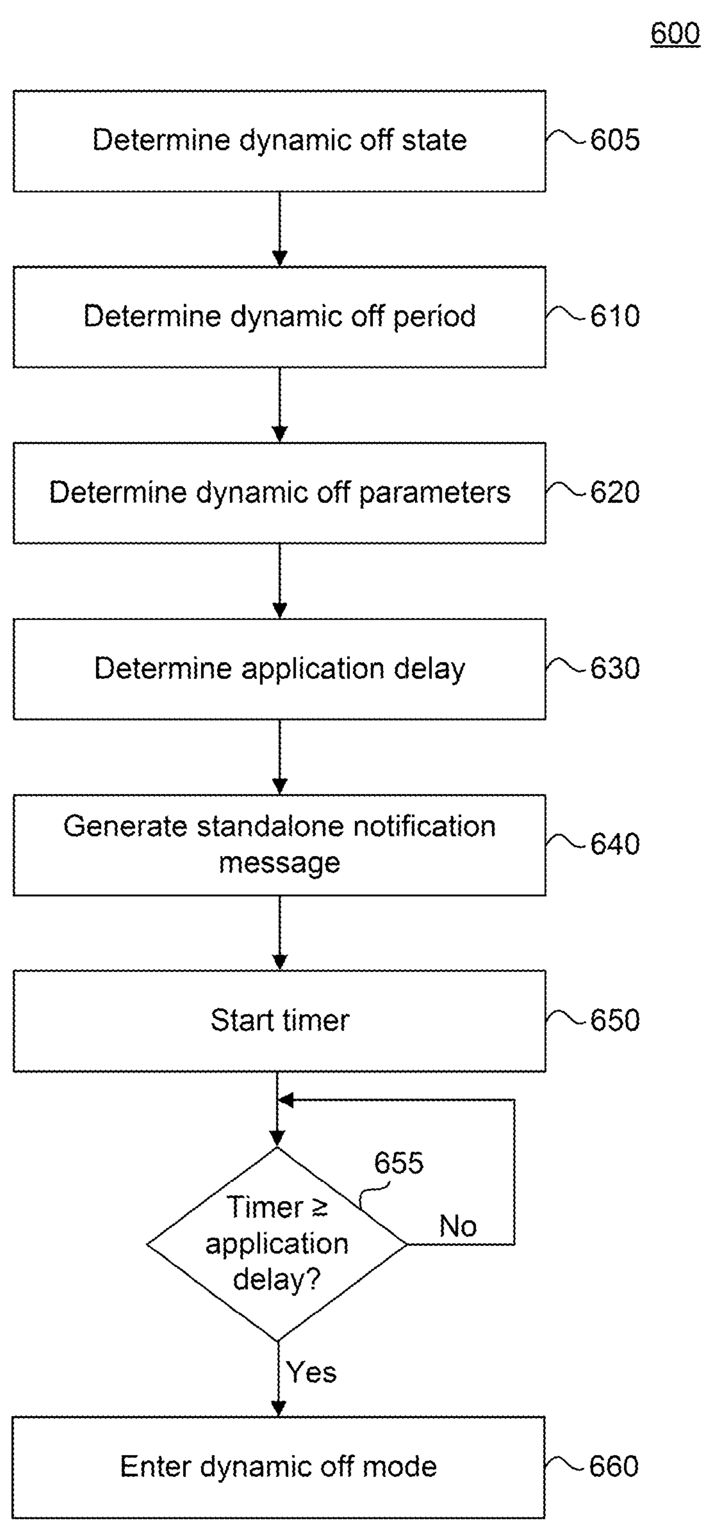
FIG. 6 illustrates a flowchart diagram of an exemplary method for signaling a dynamic on/off according aspects of the disclosure.

FIG. 6 illustrates a flowchart diagram of an exemplary method for signaling a dynamic on/off according aspects of the disclosure. As shown in FIG. 6, the base station first determines a dynamic off state during which one or more of uplink or downlink communications will be unavailable (605). The base station then determines a dynamic off period associated with the dynamic off state (610). In step 620, the base station determines the parameters associated with the dynamic off, such as the off state and off duration. Additionally, these parameters can be determined for each cell and/or each beam within each cell. Additional parameters may also be determined. In some embodiments, the base station also determines one of a periodicity with which to apply the dynamic off state. However, in other embodiments, the dynamic off state is applied for a one-time duration.

In step 630, the base station determines whether to include an application delay, and if so, how much application delay to define. As discussed above, the application delay defines an amount of delay between the transmitting of the signaling message and the entering of the dynamic off period. Once the various parameters and application delay have been determined, the base station generates a notification message in step 640. As discussed above, the notification message can explicitly identify the cells to which various parameters apply, or can be configured to imply the cells based on a known configuration of the message. In the latter scenario, the notification message can further include beam indications to dictate specific beams within the cell to which the various parameters apply.

Once the notification message is generated, the notification message is transmitted to the UE and a timer is started in step 650. The timer is repeatedly compared against the application delay in step 655. If the timer is less than the application delay (655—No), then the method returns to step 655 to once again check the time. If the timer is equal to or greater than the application delay (655—Yes), then the base station enters the dynamic off mode in step 660.

Figure 7:
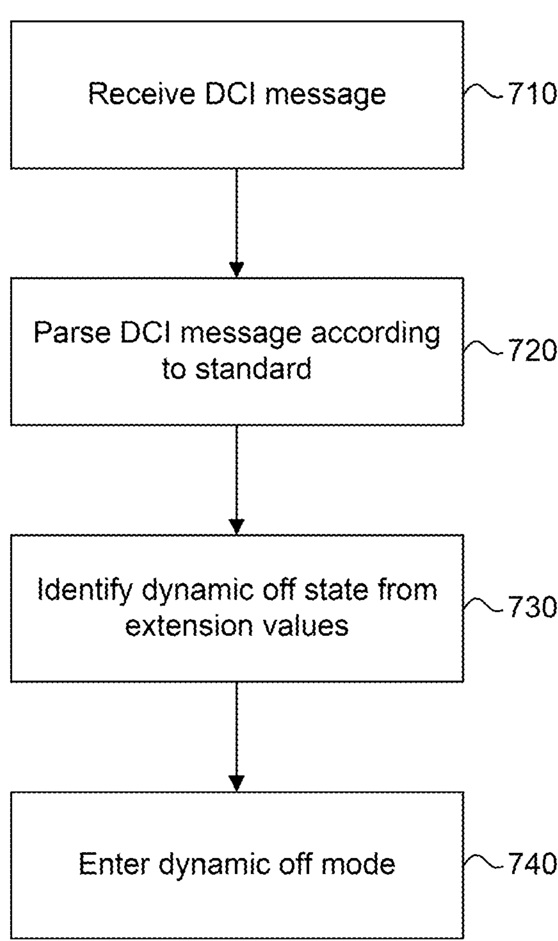
FIG. 7 illustrates a flowchart diagram of an exemplary method for processing a DCI message according to aspects of the disclosure.

FIG. 7 illustrates a flowchart diagram of an exemplary method 700 for processing a DCI message by a user equipment (UE) according to aspects of the disclosure. As shown in FIG. 7, the method begins the UE receiving the DCI message from the base station in step 710. As discussed above, in an embodiment, the DCI message may be a DCI format 2_0 message. In response, the UE parses the DCI message in step 720 according to the DCI standard. In the embodiment, parsing the message allows the UE to extract the DCI extension values defined for a DCI power saving implementation discussed above with respect to the base station operation. For example, the DCI extension values can be DCI format 56, DCI format 57, and DCI format 58, which identifies corresponding states S1, S2, S3, as discussed above with respect to FIGS. 3A-3B.

Based on the parsing of the DCI message, the UE identifies a dynamic off state from DCI extension values in step 730. In an embodiment, this is done by the UE determining the states based on the extracted DCI extension values, and comparing them to predefined dynamic off states. For example, as discussed above, the states may include states S1, S2, and/or S3 that each define various power saving modes. Based on the determined state, the UE enters the dynamic off state in step 740. Depending on the identified dynamic off state, this step may require the UE to take action. For example, for states S1 and S3, uplink reception at the base station is turned off. As a result, the UE does not provide any uplink signals to the transceiver 220 for transmission to the base station during that time. Although state S2 does not require any particular action on the part of the UE (because only downlink transmission is halted), the UE may enter a power saving state during that time period since the UE will not expect any signals to be received from the base station during that time.

Figure 8:
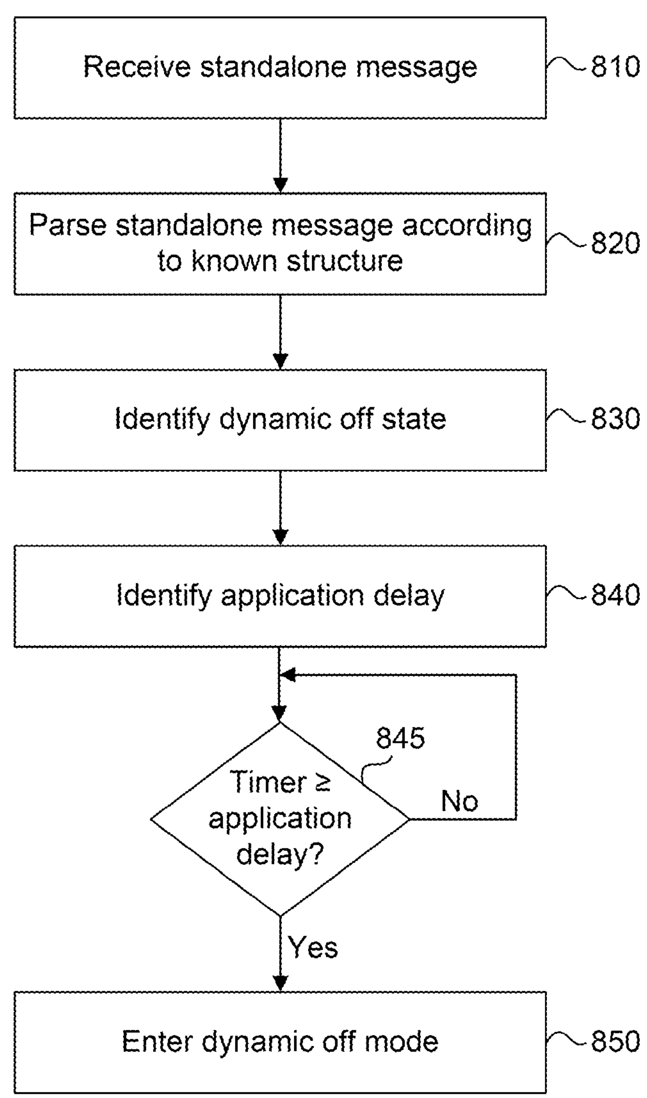
FIG. 8 illustrates a flowchart diagram of an exemplary method for processing a notification message according to aspects of the disclosure.

FIG. 8 illustrates a flowchart diagram of an exemplary method 800 for processing a notification message by a UE according to aspects of the disclosure. As shown in FIG. 8, the UE receives a notification message in step 810. The UE then parses the received notification message according to a stored message structure in step 820. As discussed above with respect to FIGS. 4A and 4B, the message can be configured with a variety of different structures. The UE is knowledgeable as to how the message format is defined, and so the UE can properly parse the message contents.

Once the contents of the message have been parsed and extracted, the UE identifies a dynamic off state included in the message in step 830. As discussed above, the notification message can define any number of different dynamic off states, and can do so for different cells, beams, etc. The notification message can also include an application delay, which the UE identifies based on the parsed information in step 840.

The UE then checks a current timer against the application delay in step 845 in order to determine whether the time has arrived to enter the dynamic off state. If the timer is less than the application delay (845—No), then the UE returns to step 845 to again check whether the application delay has been met. If, on the other hand, the application delay has been met (845—Yes), then the UE enters the dynamic off mode defined by the notification message in step 850. Once again, depending on the identified dynamic off mode, this step may require the UE to take action. For example, any state that prohibits uplink transmissions for any cell, beam, etc. will require the UE to restrict transmission to the base state for those cells, beams, etc. As a result, the UE does not provide any uplink signals to the transceiver 220 for transmission to the base station during that time for those specific beams and/or cells. Other dynamic off states may not require any particular action on the part of the UE (because only downlink transmission is halted). However, the UE may enter a power saving state during that time period since the UE will not expect any downlink signals to be received from the base station during that time.

Figure 9:
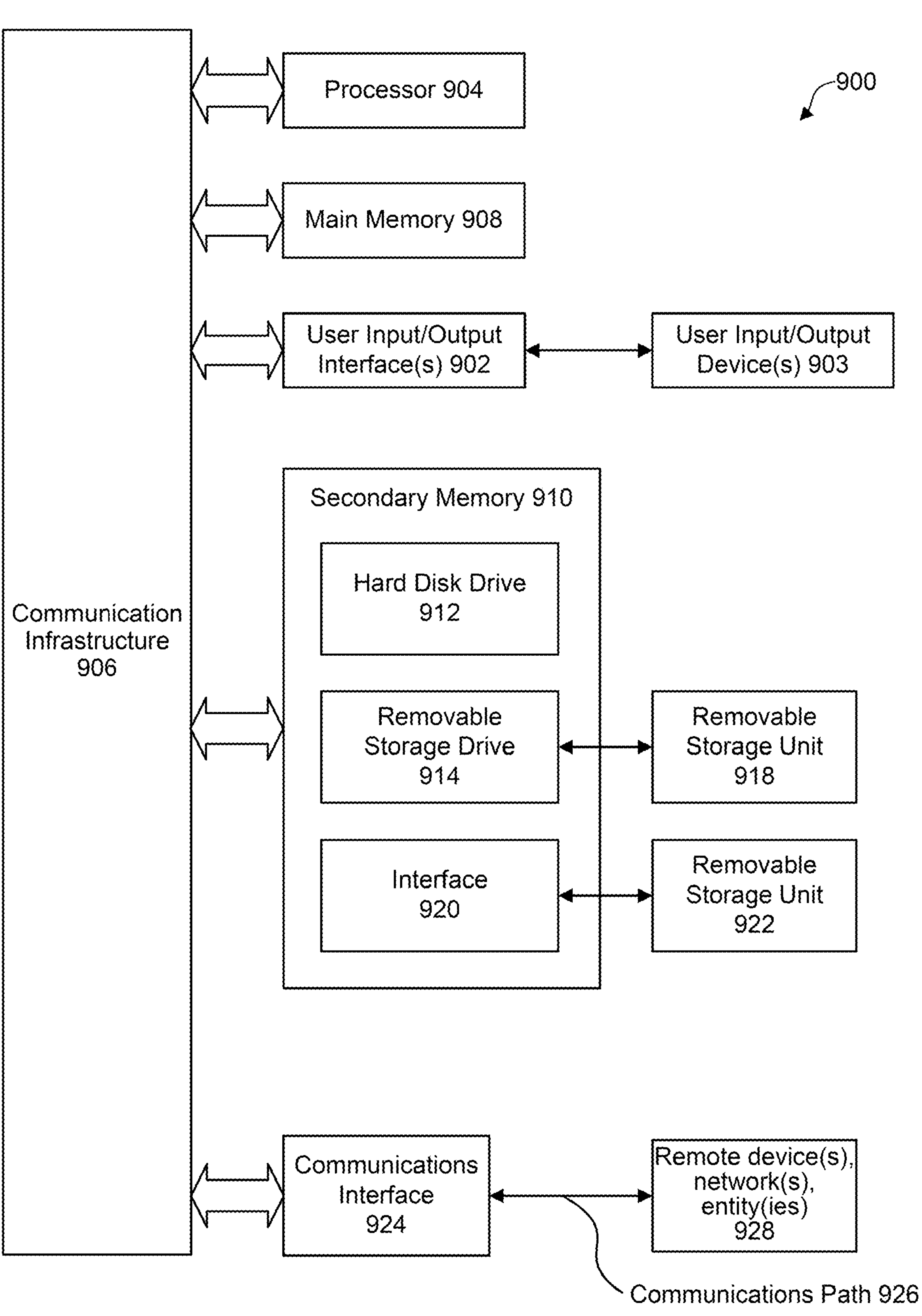
FIG. 9 illustrates an example computer system for implementing some aspects of the disclosure or portion(s) thereof.

Various aspects may be implemented, for example, using one or more computer systems, such as computer system 900 shown in FIG. 9. Computer system 900 may be any well-known computer capable of performing the functions described herein such as the UE or base station illustrated as system 200 in FIG. 2. Computer system 900 includes one or more processors (also called central processing units, or CPUs), such as a processor 904. Processor 904 is connected to a communication infrastructure 906 (e.g., a bus.) Computer system 900 also includes user input/output device(s) 903, such as monitors, keyboards, pointing devices, etc., that communicate with communication infrastructure 906 through user input/output interface(s) 902. Computer system 900 also includes a main or primary memory 908, such as random access memory (RAM). Main memory 908 may include one or more levels of cache. Main memory 908 has stored therein control logic (e.g., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to some aspects, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

The operations in the preceding aspects may be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 900, main memory 908, secondary memory 910 and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 9. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A base station comprising:
- a transceiver configured to communicate wireless signals with a user equipment (UE); and
- one or more processors configured to:
  - determine a dynamic off state for the base station, the dynamic off state suspending at least one of downlink (DL) transmission or uplink (UL) reception during a dynamic off period;
  - determine the dynamic off period for the base station during which to apply the dynamic off state;
  - generate a downlink control information (DCI) message having a slot format indicator;
  - generate a notification message different from the DCI message, wherein the notification message identifies a predefined on/off pattern of a plurality of predefined on/off patterns that define a periodicity with which to apply the dynamic off state and that activates and deactivates the identified predefined on/off pattern and wherein the activation or the deactivation of the identified predefined on/off pattern occurs after an application delay; and
  - transmit, via the transceiver, the DCI message and the notification message to the UE.

2. The base station of claim 1, wherein the one or more processors are further configured to enter the dynamic off state.

3. The base station of claim 1, wherein the slot format indicator includes a newly-defined DCI value corresponding to a slot format combination that includes one of a plurality of dynamic off states.

4. The base station of claim 3, wherein the one or more processors are further configured to generate an entry within the slot format indicator that includes the newly-defined DCI value associated with the dynamic off state.

5. The base station of claim 1, wherein the one or more processors are further configured to generate the notification message with an explicit beam index.

6. The base station of claim 5, wherein the explicit beam index is included within a predefined field of the notification message.

7. The base station of claim 1, wherein the notification message further defines a first application delay applicable to the DL transmission and a second application delay applicable to the UL reception.

8. A method for initiating a dynamic off period at a base station, comprising:
- determining a dynamic off state for the base station during which at least one of downlink (DL) transmission or uplink (UL) reception is suspended;
- determining the dynamic off period during which to apply the dynamic off state;
- generating a downlink control information (DCI) message having a slot format indicator;
- generating a notification message different from the DCI message, wherein the notification message identifies a predefined on/off pattern of a plurality of predefined on/off patterns that define a periodicity with which to apply the dynamic off state and that activates and deactivates the identified predefined on/off pattern and wherein the activation or the deactivation of the identified predefined on/off pattern occurs after an application delay; and
- transmitting the DCI message and the notification message to a user equipment (UE).

9. The method of claim 8, further comprising entering the dynamic off state.

10. The method of claim 8, wherein the slot format indicator of the DCI message includes a newly-defined DCI value corresponding to the dynamic off state.

11. The method of claim 10, further comprising generating an entry within the slot format indicator of the DCI message that includes the newly-defined DCI value associated with the dynamic off state.

12. The method of claim 8, wherein the generating includes generating the notification message with an explicit beam index.

13. The method of claim 12, wherein the explicit beam index is included within a predefined field of the notification message.

14. A method for initiating a dynamic off period at a base station, comprising:
- determining a dynamic off state for the base station;
- determining the dynamic off period during which to apply the dynamic off state;
- determining dynamic off parameters associated with the dynamic off state;
- determining an application delay that defines a starting point of the dynamic off period;
- generating a downlink control information (DCI) message having a slot format indicator;
- generating a notification message different from the DCI message, wherein the notification message identifies a predefined on/off pattern of a plurality of predefined on/off patterns that define a periodicity with which to apply the dynamic off state and that activates and deactivates the identified predefined on/off pattern and wherein the activation or the deactivation of the identified predefined on/off pattern occurs after the application delay;
- transmitting the DCI message and the notification message to a user equipment (UE); and
- entering the dynamic off state according to the dynamic off parameters after an elapse of the application delay.

15. The method of claim 14, wherein the dynamic off parameters indicate whether downlink (DL) transmission will be suspended during the dynamic off period, and whether uplink (UL) reception will be suspended during the dynamic off period.

16. The method of claim 14, wherein the dynamic off parameters include indications of one or more cells to which the dynamic off parameters apply.

17. The method of claim 14, wherein the dynamic off parameters include indications of one or more beams to which the dynamic off parameters apply.

18. The method of claim 14, wherein the application delay defines an amount of delay between transmission of the notification message and a start of the dynamic off period.

19. The method of claim 14, wherein the notification message includes a plurality of cell indices for identifying cell-specific parameters.

20. The method of claim 14, wherein the dynamic off period is a one-time duration.

* * * * *